(12) United States Patent
Kim et al.

(10) Patent No.: US 10,679,355 B2
(45) Date of Patent: Jun. 9, 2020

(54) SYSTEM AND METHOD FOR DETECTING MOVING OBSTACLES BASED ON SENSORY PREDICTION FROM EGO-MOTION

(71) Applicant: HRL Laboratories, LLC, Malibu, CA (US)

(72) Inventors: Kyungnam Kim, Oak Park, CA (US); Hyukseong Kwon, Thousand Oaks, CA (US); Heiko Hoffmann, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 153 days.

(21) Appl. No.: 15/960,513

(22) Filed: Apr. 23, 2018

(65) Prior Publication Data

US 2018/0322640 A1 Nov. 8, 2018

Related U.S. Application Data

(60) Provisional application No. 62/500,071, filed on May 2, 2017.

(51) Int. Cl.
*G06T 7/20* (2017.01)
*G06K 9/46* (2006.01)
(Continued)

(52) U.S. Cl.
CPC ............. *G06T 7/20* (2013.01); *B60W 30/09* (2013.01); *G01P 3/42* (2013.01); *G01S 17/50* (2013.01); *G01S 17/86* (2020.01); *G01S 17/89* (2013.01); *G01S 17/93* (2013.01); *G01S 17/931* (2020.01); *G01S 17/933* (2013.01); *G05D 1/024* (2013.01); *G05D 1/0251* (2013.01);
(Continued)

(58) Field of Classification Search
None
See application file for complete search history.

(56) References Cited

U.S. PATENT DOCUMENTS

| 7,068,815 B2 | 6/2006 | Chang et al. |
| 2010/0183192 A1* | 7/2010 | Fritsch .................. G06T 7/254 |
| | | 382/103 |
| 2016/0046290 A1 | 2/2016 | Aharony et al. |

FOREIGN PATENT DOCUMENTS

KR 10-2014-0043023 A 4/2014

OTHER PUBLICATIONS

International Preliminary Report on Patentability for PCT/US2018/028967; dated May 15, 2019.
(Continued)

*Primary Examiner* — Matthew C Bella
*Assistant Examiner* — Brian D Shin
(74) *Attorney, Agent, or Firm* — Tope-McKay & Associates

(57) ABSTRACT

Described is a system for detecting moving objects. During operation, the system obtains ego-motion velocity data of a moving platform and generates a predicted image of a scene proximate the moving platform by projecting three-dimensional (3D) data into an image plane based on pixel values of the scene. A contrast image is generated based on a difference between the predicted image and an actual image taken at a next step in time. Next, an actionable prediction map is then generated based on the contrast mage. Finally, one or more moving objects may be detected based on the actionable prediction map.

19 Claims, 7 Drawing Sheets

(51) Int. Cl.

| | | |
|---|---|---|
| *G01S 17/93* | (2020.01) | |
| *B60W 30/09* | (2012.01) | |
| *G01S 17/89* | (2020.01) | |
| *G01P 3/42* | (2006.01) | |
| *G05D 1/02* | (2020.01) | |
| *G08G 1/16* | (2006.01) | |
| *G08G 5/04* | (2006.01) | |
| *G06T 7/70* | (2017.01) | |
| *G06T 5/00* | (2006.01) | |
| *G01S 17/933* | (2020.01) | |
| *G01S 17/50* | (2006.01) | |
| *G08G 1/04* | (2006.01) | |
| *G06K 9/00* | (2006.01) | |
| *G06T 7/292* | (2017.01) | |
| *G06T 7/73* | (2017.01) | |
| *G06K 9/62* | (2006.01) | |
| *G06T 7/254* | (2017.01) | |
| *G01S 17/86* | (2020.01) | |
| *G01S 17/931* | (2020.01) | |
| *G05D 1/00* | (2006.01) | |
| *G08G 5/00* | (2006.01) | |

(52) U.S. Cl.
CPC ....... *G05D 1/0253* (2013.01); *G06K 9/00805* (2013.01); *G06K 9/4628* (2013.01); *G06K 9/6271* (2013.01); *G06T 5/002* (2013.01); *G06T 7/254* (2017.01); *G06T 7/292* (2017.01); *G06T 7/70* (2017.01); *G06T 7/74* (2017.01); *G08G 1/04* (2013.01); *G08G 1/166* (2013.01); *G08G 5/04* (2013.01); *G05D 1/0094* (2013.01); *G05D 2201/0213* (2013.01); *G06T 2207/10012* (2013.01); *G06T 2207/10016* (2013.01); *G06T 2207/10028* (2013.01); *G06T 2207/20076* (2013.01); *G06T 2207/20081* (2013.01); *G06T 2207/20084* (2013.01); *G06T 2207/20221* (2013.01); *G06T 2207/30261* (2013.01); *G08G 5/0039* (2013.01)

(56) References Cited

OTHER PUBLICATIONS (KITTI) Geiger2013IJRR, Andreas Geiger, Philip Lenz, Christoph Stiller and Raquel Urtasun, Vision meets Robotics: The KITTI Dataset, International Journal of Robotics Research (IJRR), 2013, pp. 1-5.

Paul Viola and Michael J. Jones. Rapid Object Detection using a Boosted Cascade of Simple Features. IEEE CVPR, 2001, pp. I-511-I-518.

Rainer Lienhart and Jochen Maydt. An Extended Set of Haar-like Features for Rapid Object Detection. IEEE ICIP 2002 vol. 1, pp. 900-903, Sep. 2002.

Navneet Dalal and Bill Triggs. Histograms of Oriented Gradients for Human Detection. IEEE Conference on Computer Vision and Pattern Recognition (CVPR), vol. II, pp. 886-893, Jun. 2005.

P. Felzenszwalb, R. Girshick, D. McAllester and D. Ramanan: Object Detection with Discriminatively Trained Part-Based Models. PAMI 2010, pp. 1-20.

J. Engel, T. Schöps, D. Cremers. LSD-SLAM: Large-Scale Direct Monocular SLAM, In European Conference on Computer Vision (ECCV), 2014, pp. 1-16.

A. Angelova, A. Krizhevsky, V. Vanhoucke. Pedestrian Detection with a Large-Field-Of-View Deep Network, ICRA 2015, pp. 1-8.

R. Girshick, J. Donahue, T. Darrell, J. Malik. Region-based Convolutional Networks for Accurate Object Detection and Semantic Segmentation. IEEE Transactions on Pattern Analysis and Machine Intelligence, vol. 38, No. 1, 2016, pp. 142-158.

Liu, W., Anguelov, D., Erhan, D., Szegedy, C., Reed, S., Fu, C.Y. and Berg, A.C., Ssd: Single shot multibox detector. In European conference on computer vision. Springer, Cham., pp. 21-37, 2016.

Ren, S., He, K., Girshick, R. and Sun, J., Faster r-cnn: Towards real-time object detection with region proposal networks. In Advances in neural information processing systems. 2015, pp. 91-99.

Ren Wu, Shengen Yan, Yi Shan, Qingqing Dang, Gang Sun. Deep Image: Scaling up Image Recognition, Feb. 6, 2015, pp. 1-8. https://arxiv.org/pdf/1501.02876v2.pdf.

Notification of Transmittal of International Search Report and the Written Opinion of the International Searching Authority for PCT/US2018/028967; dated Aug. 21, 2018.

International Search Report of the International Searching Authority for PCT/US2018/028967; dated Aug. 21, 2018.

Written Opinion of the International Searching Authority for PCT/US2018/028967; dated Aug. 21, 2018.

Boyoon Jung et al., 'Detecting Moving Objects using a Single Camera on a Mobile Robot in an Outdoor Environment', the 8th Conference on Intelligent Autonomous Systems, Amsterdam, The Netherlands, Mar. 13, 2004, pp. 980-987.

Zhaozheng Yin et al., 'Moving Object Localization in Thermal Imagery by Forward-backward MHI', Conference on Computer Vision and Pattern Recognition, New York City, New York, Jun. 22, 2006, pp. 1-8.

\* cited by examiner

SYSTEM AND METHOD FOR DETECTING MOVING OBSTACLES BASED ON SENSORY PREDICTION FROM EGO-MOTION

CROSS-REFERENCE TO RELATED APPLICATIONS

This application claims the benefit of and is a non-provisional patent application of U.S. Provisional Application No. 62/500,071, filed on May 2, 2017, the entirety of which is hereby incorporated by reference.

BACKGROUND OF INVENTION

(1) Field of Invention

The present invention relates to an object detection system and, more specifically, to a system for detecting moving objects based on sensory prediction from ego-motion.

(2) Description of Related Art

Object detection and recognition is a necessary feature in a variety of applications. During operation and in dynamic environments, a problem can arise due to noisy input data. For example, the detection and recognition of objects is often problematic in situations when the sensory input is corrupted by disturbances or nuisances.

The prior art for object detection and recognition has been dominated by approaches that extract features (such as edges or gradients) from an image without taking into account how the image was generated through dimensional reducing projection (e.g., from three-dimensional (3D) to two-dimensional (2D)). For example, many current methods for object detection are based on the Haar Feature-based Cascade Classifiers (see the List of Incorporated Literature References, Literature Reference Nos. 2 and 3), Histograms of Oriented Histograms (see Literature Reference No. 4) or Deformable Parts Model (see Literature Reference No. 5). Such approaches are sensitive to structural noise that deviates from Gaussian noise. These methods did not explicitly use the information about the ego-motion of the camera and the relative velocity of the surroundings and objects to estimate the expected transformation in the camera image.

Deep learning, particularly, convolutional neural networks (see Literature Reference Nos. 7 and 8) have shown the best performance for object recognition. However, on their own, they are insufficient for detecting moving obstacles in a scene, particularly, since the false-alarm rates are too high for an exhaustive search in an image. Even region-based segmentation with convolutional neural networks, R-CNN (see Literature Reference No. 9), turned out to be insufficient.

Thus, a continuing need exists for a reliable system and method for detecting moving obstacles in a wide range of conditions (e.g., rain, snow, dirt, etc.).

SUMMARY OF INVENTION

Described is a system for detecting moving objects. In various some, the system includes one or more processors and a memory, the memory being a non-transitory computer-readable medium having executable instructions encoded thereon, such that upon execution of the instructions, the one or more processors perform several operations, such as obtaining ego-motion velocity data of a moving platform; generating a predicted image of a scene proximate the moving platform by projecting three-dimensional (3D) data into an image plane based on pixel values of the scene; generating a contrast image based on a difference between the predicted image and an actual image taken at a next step in time; generating an actionable prediction map based on the contrast mage; and detecting one or more moving objects based on the actionable prediction map.

In another aspect, the predicted image is generated for multiple time steps, resulting in both forward and backward actionable prediction maps.

In another aspect, the system performs an operation of generating a minimized actionable prediction map by removing ghost pixels from both the forward and backward actionable prediction maps.

In yet another aspect, the system performs an operation of overlaying the minimized actionable prediction map on an actual image of the scene to generate a final overlay.

In another aspect, the 3D data is obtained from a stereo camera.

In yet another aspect, the 3D data is obtained from a LIDAR sensor mounted on the moving platform and the pixel values of the scene are obtained from an image taken from a camera mounted on the moving platform. The LIDAR sensor and camera are mounted on the moving platform such that they are co-boresighted to look at a common field-of-view around the moving platform.

In yet another aspect, the system performs operation of controlling a device based on the detection of the one or more objects. In some embodiments, controlling the device includes causing a vehicle to maneuver to avoid collision with the object.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
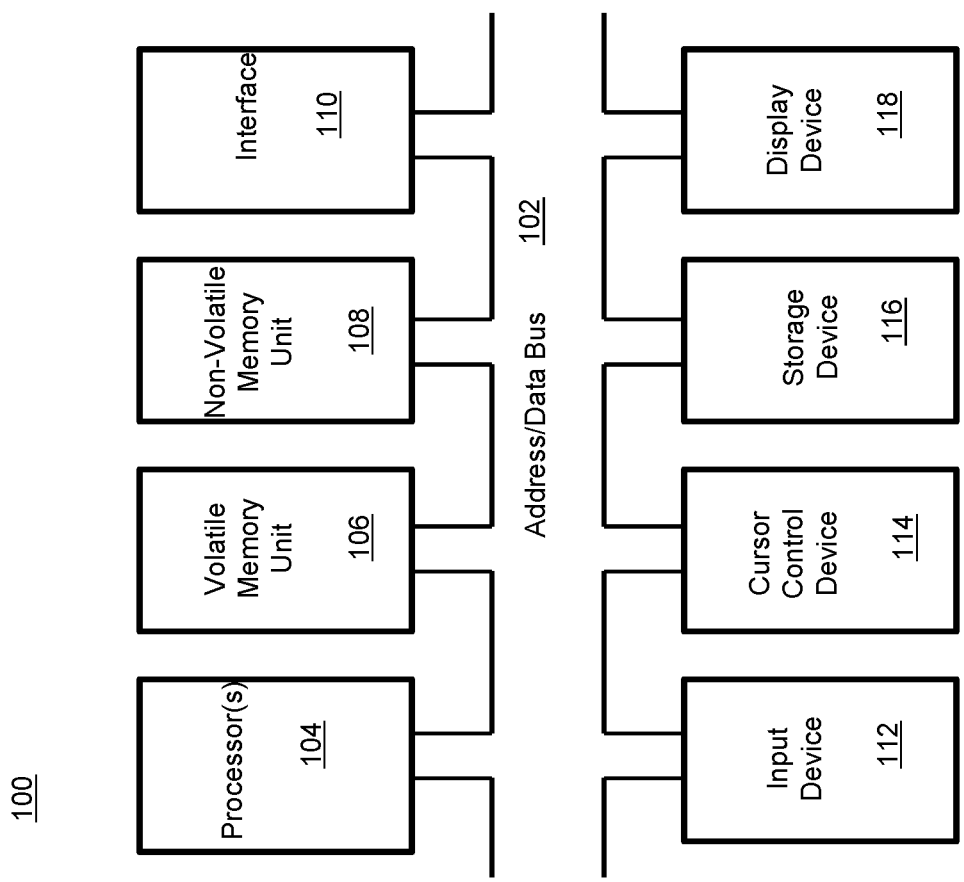
FIG. 1 is a block diagram depicting the components of a system according to various embodiments of the present invention.

The present invention relates to an object detection system and, more specifically, to a system for detecting moving objects based on sensory prediction from ego-motion. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. (KITTI) Geiger2013IJRR, Andreas Geiger, Philip Lenz, Christoph Stiller and Raquel Urtasun, Vision meets Robotics: The KITTI Dataset, International Journal of Robotics Research (IJRR), 2013.
2. Paul Viola and Michael J. Jones. Rapid Object Detection using a Boosted Cascade of Simple Features. IEEE CVPR, 2001.
3. Rainer Lienhart and Jochen Maydt. An Extended Set of Haar-like Features for Rapid Object Detection. IEEE ICIP 2002, Vol. 1, pp. 900-903, September 2002.
4. Navneet Dalal and Bill Triggs. Histograms of Oriented Gradients for Human Detection. IEEE Conference on Computer Vision and Pattern Recognition (CVPR), vol. II, pages 886-893, June 2005.
5. P. Felzenszwalb, R. Girshick, D. McAllester and D. Ramanan: Object Detection with Discriminatively Trained Part-Based Models. PAMI 2010.
6. J. Engel, T. Schops, D. Cremers. LSD-SLAM: Large-Scale Direct Monocular SLAM, In European Conference on Computer Vision (ECCV), 2014.
7. A. Angelova, A. Krizhevsky, V. Vanhoucke. Pedestrian Detection with a Large-Field-Of-View Deep Network, ICRA 2015.
8. Ren Wu, Shengen Yan, Yi Shan, Qingqing Dang, Gang Sun. Deep Image: Scaling up Image Recognition, Feb. 6, 2015.
9. R. Girshick, J. Donahue, T. Darrell, J. Malik. Region-based Convolutional Networks for Accurate Object Detection and Semantic Segmentation. IEEE Transactions on Pattern Analysis and Machine Intelligence (accepted May 18, 2015).
10. Liu, W., Anguelov, D., Erhan, D., Szegedy, C., Reed, S., Fu, C. Y. and Berg, A. C., Ssd: Single shot multibox detector. In *European conference on computer vision* (pp. 21-37). Springer, Cham. (October, 2016).
11. Ren, S., He, K., Girshick, R. and Sun, J., Faster r-cnn: Towards real-time object detection with region proposal networks. In *Advances in neural information processing systems* (pp. 91-99), (2015).

(2) Principal Aspects

Various embodiments of the invention include three "principal" aspects. The first is a system for system for detecting moving objects. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
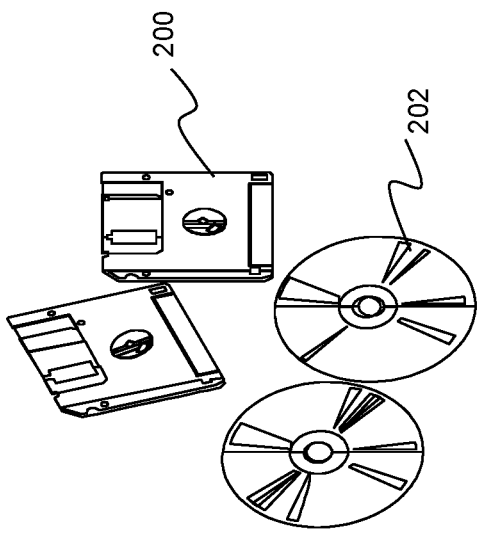
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure provides a system and method to exploit sensory prediction from ego-motion to detect moving obstacles and their velocity. To detect moving obstacles, the system predicts the sensory input (e.g., three-dimensional (3D) light detection and ranging (LIDAR) or two-dimensional (2D) camera) due to the ego-motion of the object (e.g., car, etc.). The ego-motion includes 3D velocity and 3D angular velocity. The predicted sensory input is compared with the actual sensory input at the corresponding time. When predicting 3D LIDAR input, the LIDAR input is projected onto the image plane. The difference between prediction and actual input provides image regions where objects moved relative to the background since only sensory input from a static scene deforms as predicted under ego-motion. On the extracted image regions, object recognition is performed to find the moving obstacles, such cars, pedestrians, etc. This recognition step eliminates artifacts in the sensory prediction. A unique aspect of the system is twofold: 1) using the self-motion estimate and LIDAR-to-camera projection to obtain an actionable prediction map (APM), and 2) using multiple APM history images for more reliable obstacle detection and recognition. The use of the LIDAR-to-camera projection eliminates the uncertainty in estimating the depth (or range) values from the sensor to objects, which is needed for accurate sensory prediction but very hard to achieve from a single camera sensor. Further, the APM history images are selectively combined over multiple frames and the final APM contains true detections of moving objects with less noise and ghost pixels.

Given the unique aspects, the system provides a technological improvement over the prior art that dramatically increases moving obstacle detection. The system of this disclosure dramatically improves the detection and recognition of objects in situations when the sensory input is corrupted by disturbances or nuisances, e.g., due to heavy rain, sun glare, or snow. An advantage of the invention is that is takes the generation of the sensory input into account for uncovering task-relevant information hidden in the sensory input. The APM is used to improve detection and reduce false alarms. As can be appreciated by those skilled in the art, there are several applications in which the system of this disclosure can be implemented. Further detail regarding the process and example applications are provided below.

(4) Specific Details of Various Embodiments

As noted above, the system described herein is designed to reliably detect and recognize independently moving objects as observed from a moving platform. To confirm the functions and advantage of the system, image prediction from ego motion was implemented, with the detection of moving obstacles subsequently tested based on the ego-motion prediction. Although future images could be predicted using a neural network, the predicted images tended to be more blurred compared to the original (which caused a lot of artifacts when doing the comparison with real images). Thus, although not limited thereto, LIDAR was used as input for the prediction to provide the 3D data. As yet another example input, 3D data extracted from stereo cameras could be used (as a less expensive choice for commercialization).

Figure 3:
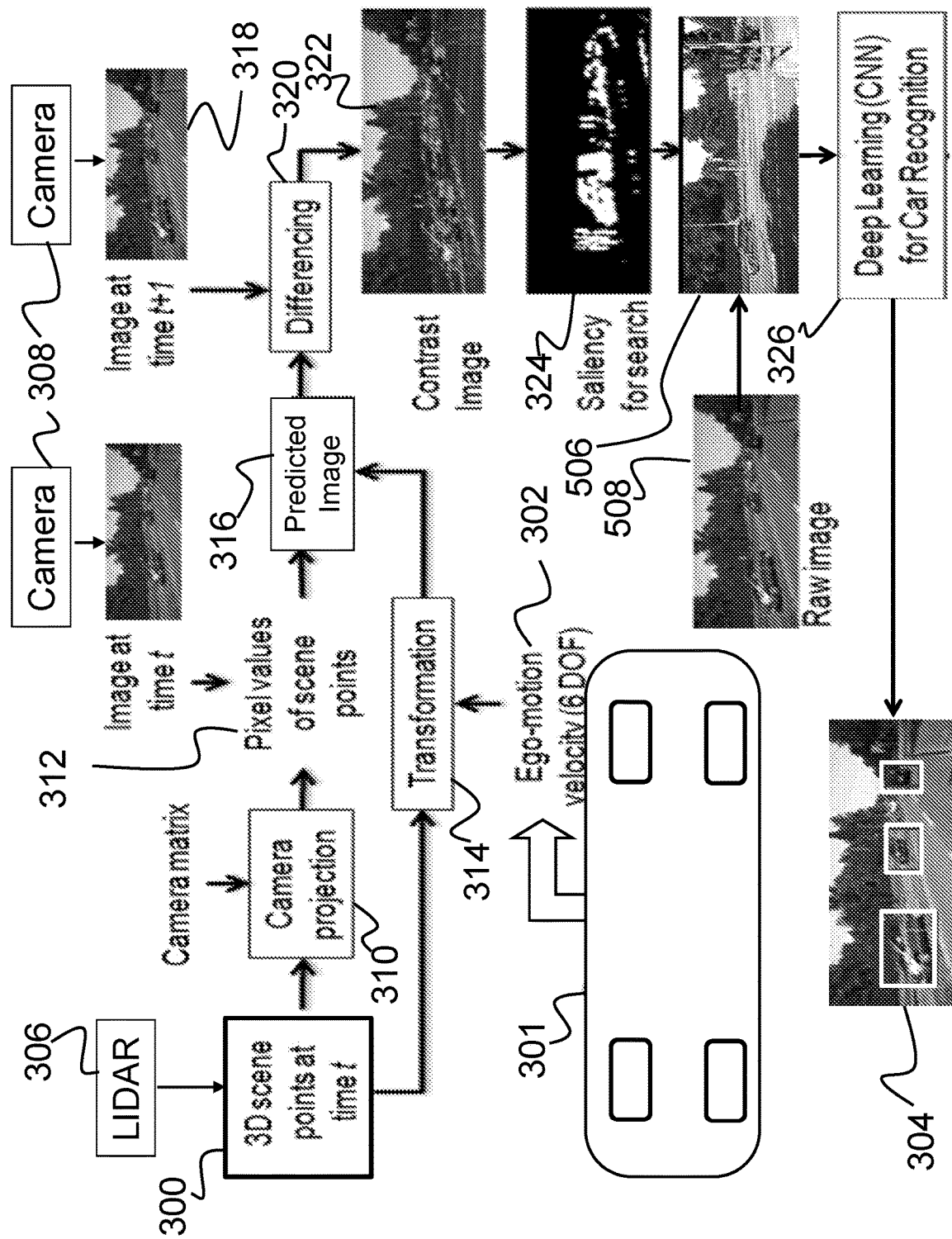
FIG. 3 is a functional flow diagram of Actionable Prediction Map (APM) generation and car recognition using a Deep Learning classifier.

As shown in FIG. 3, given the LIDAR data 300 and ego-motion velocity data 302 of the moving platform 301 (e.g., car, plane, drone, etc.), the system was able to successfully detect 304 moving objects in image scenery proximate the moving platform 301. The ego-motion velocity data 302 of the moving platform 301 is obtained using any suitable sensors to determine the ego-motion information of the platform 301 and corresponding LIDAR sensors or cameras, etc. As a non-limiting example, sensors for velocity (e.g., 3D accelerometer, 3D airflow velocity vector sensor, GPS, 3D gyroscope sensor (for 3D angular velocity), etc.) and/or yaw rate (rotational speed around the height axis) (e.g., tilt sensor) may be used to obtain the ego-motion velocity data 302.

Specifically, FIG. 3 provides a functional flow diagram of the system, depicting how the components are connected and what process is performed in each component. In various embodiments, there are a set of LIDAR 306 and camera 308 (one or more) sensors looking at the same field of view (i.e., co-boresighted) around the platform 301 (e.g., car). The LIDAR 306 and camera 308 (e.g., 2D cameras) sensors are assumed to be pre-calibrated for generation of the camera matrix for the projection from 3D LIDAR to the 2D image. The LIDAR data 300 (3D scene point at time t from LIDAR) is projected into the image plane of the camera, as a camera projection 310. The pixel value 312 of that scene point will be used to compare with the predicted pixel.

Based on the ego-motion velocity data 302 (3D velocity and 3D angular velocity) from time t to t+1, the 3D scene point 300 can be transformed 314 into the predicted 3D location at time t+1. The 3D translation (from velocity) and 3D rotation amount (from angular velocity) between time t and t+1 are added to the current 3D scene point to obtain the predicted 3D location at time t+1.

All the 3D scene points 300 from LIDAR 306 are transformed 314 and projected into an image plane (as a predicted image 316) with the corresponding pixel values 312 obtained in the previous step. The projection occurs by applying the camera matrix to the 3D scene points 300.

This predicted image 316 is compared with the actual image 318 taken at time t+1 from the camera 308. While all the (static) background scene points follow the transformation induced by the ego-motion, the scene points on independently moving objects are projected into new locations different from the prediction. By calculating the difference 320 between the predicted image 316 and actual image 318 at time t+1, image regions are obtained (as a contrast image 322) where objects moved relative to the background since only sensory input from a static scene deforms as predicted under ego-motion. In other words, the contrast image 322 illustrates detected regions of movement.

Figure 4:
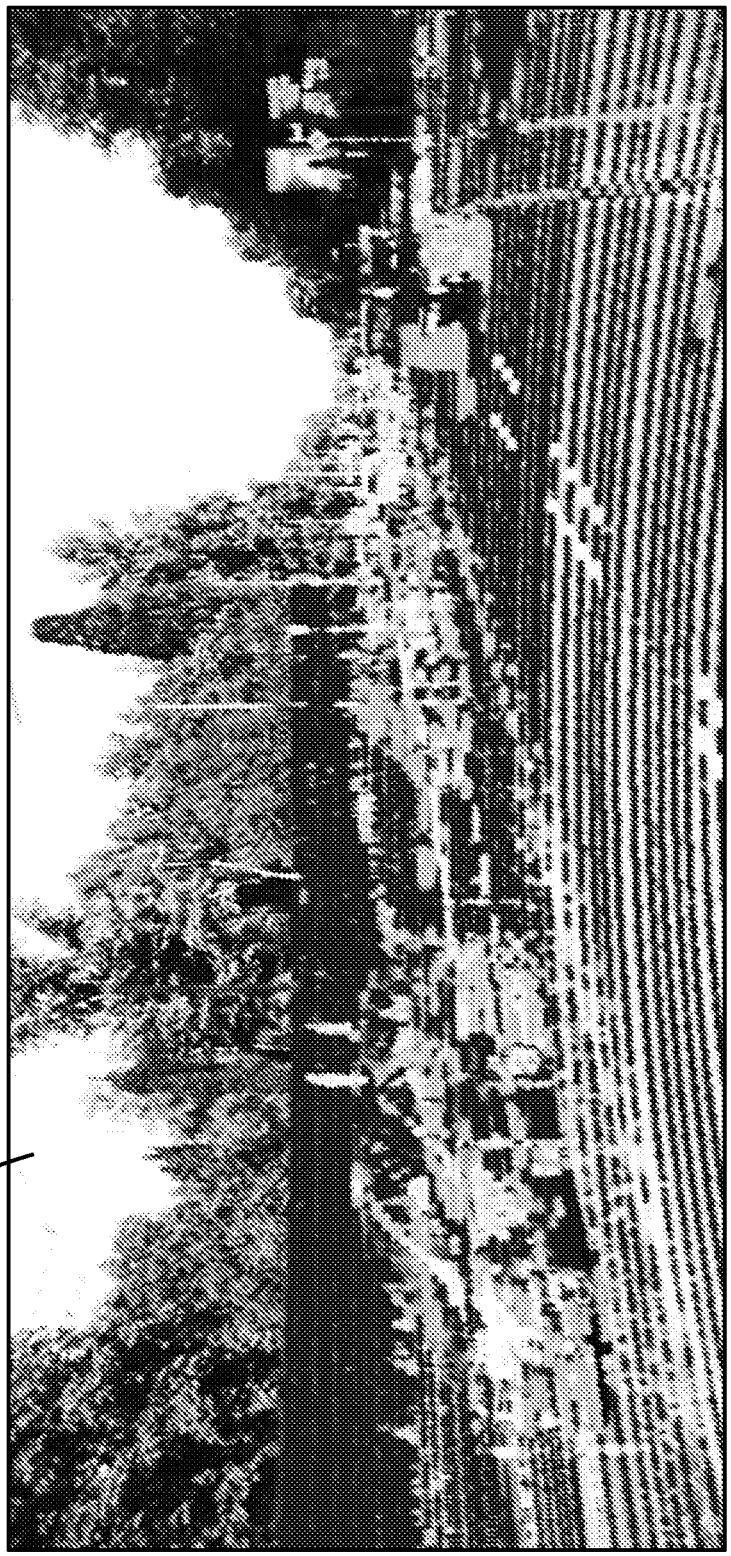
FIG. 4 is an illustration depicting prediction and rending of three-dimensional (3D) scene points based on known ego-motion and camera matrix.

FIG. 4, for example, provides an example of a contrast image 322, showing detected image regions of movement. This difference can be further used to estimate the velocity of the detected moving objects. Velocity can be estimated by comparing the prediction at t+1 against the actual input at t+1 in the 3D space corresponding to the LIDAR data (velocity=estimated distance between point clouds divided by length of time interval).

Given the contrast image 322, a variety of state-of-the-art saliency or feature extraction processes can be employed to generate the actionable prediction map (APM) 324. For example, the contrast image 322 is converted to a binary image using a threshold value (equal to the average contrast value) and then each pixel in the binary image can be merged and clustered into a blob based on its connectivity with its neighboring pixels. Morphological image operations are applied to make the detected blobs smoothed by filling holes and removing noise. The output image after these operations is the APM 324.

Figure 5:
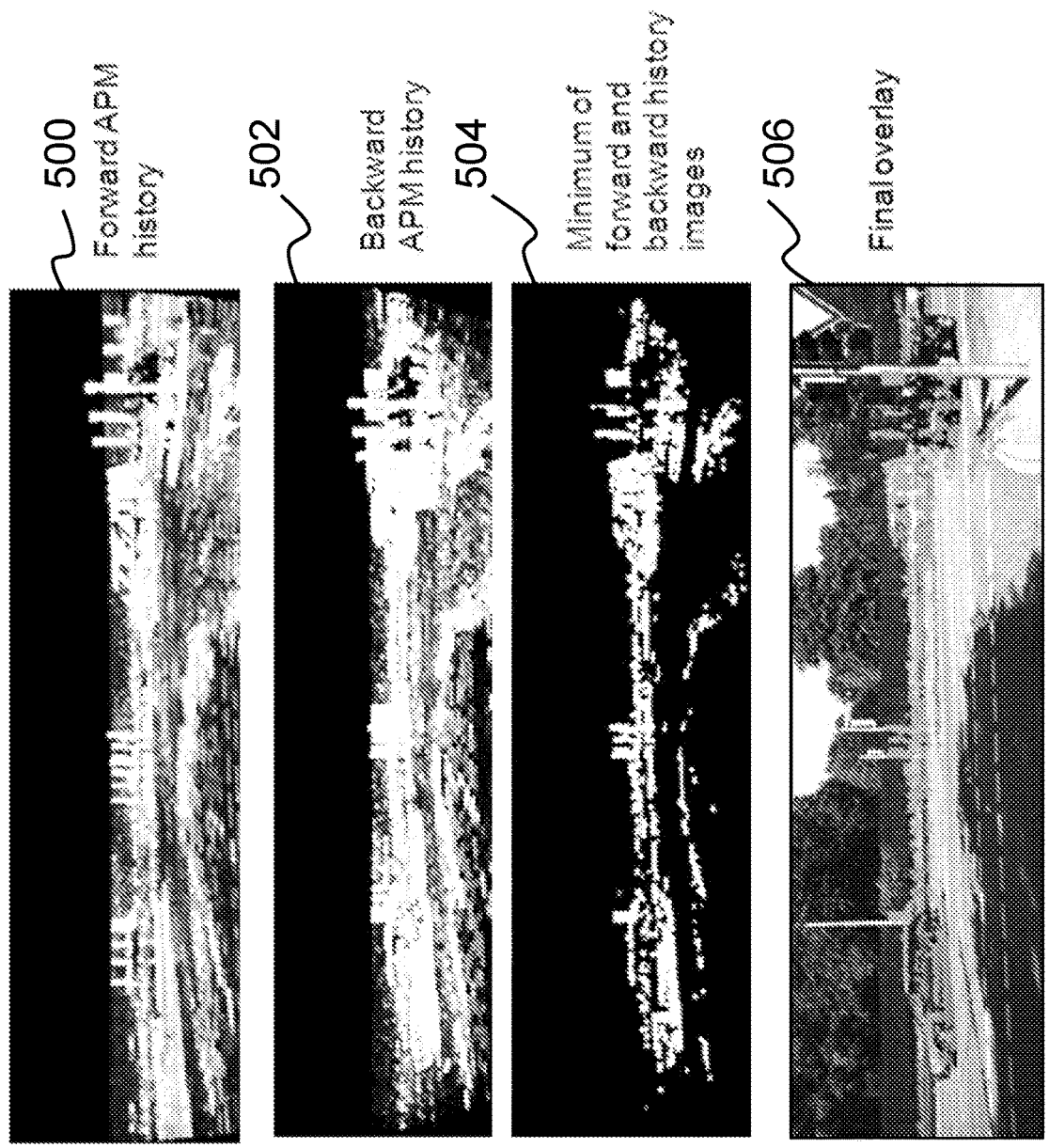
FIG. 5 is an illustration depicting APM generation using Forward and Backward Motion History.

For detection, if the system were to use the difference between only two frames, the system would get image regions where the surrounding objects moved only within that time interval, which usually does not cover the entire body of an object (only partially depending on the speed of the platform). Therefore, the system according to various embodiments accumulates difference pixels, over more than two frames. As seen from FIG. 5, the forward APM 500 and backward APM 502 history images are obtained by accumulating the APM image forward and backward in time. From these history images 500 and 502, the minimum between the pixel values in 500 and 502 is selected at each pixel location, which effectively removes ghost pixels (the head and tail of a moving object) and results in a final combined APM 504. The final APM 504 is then overlaid on the original image (shown as element 508 in FIG. 3) to generate a final overlay 506.

The final overlay 506 shows the ghost pixels removed from the forward 500 and backward 502 history images, and only the actual objects remain. Due to the uncertainty in ego-motion velocity, thin and slim objects (such as poles, lines, or trees) tend to be detected as well.

Referring again to FIG. 3, the final overlay 506 can be run through any trained object detector 326 to provide the resulting object detection 304. As a non-limiting example and as implemented in the car application scenario, a deep learning convolutional neural network (CNN) can be used as the object detector 326 to detect the objects within the final overlay 506. Non-limiting examples of suitable object detectors 326 include those as described in Literature Reference Nos. 10 and 11.

Figure 6:
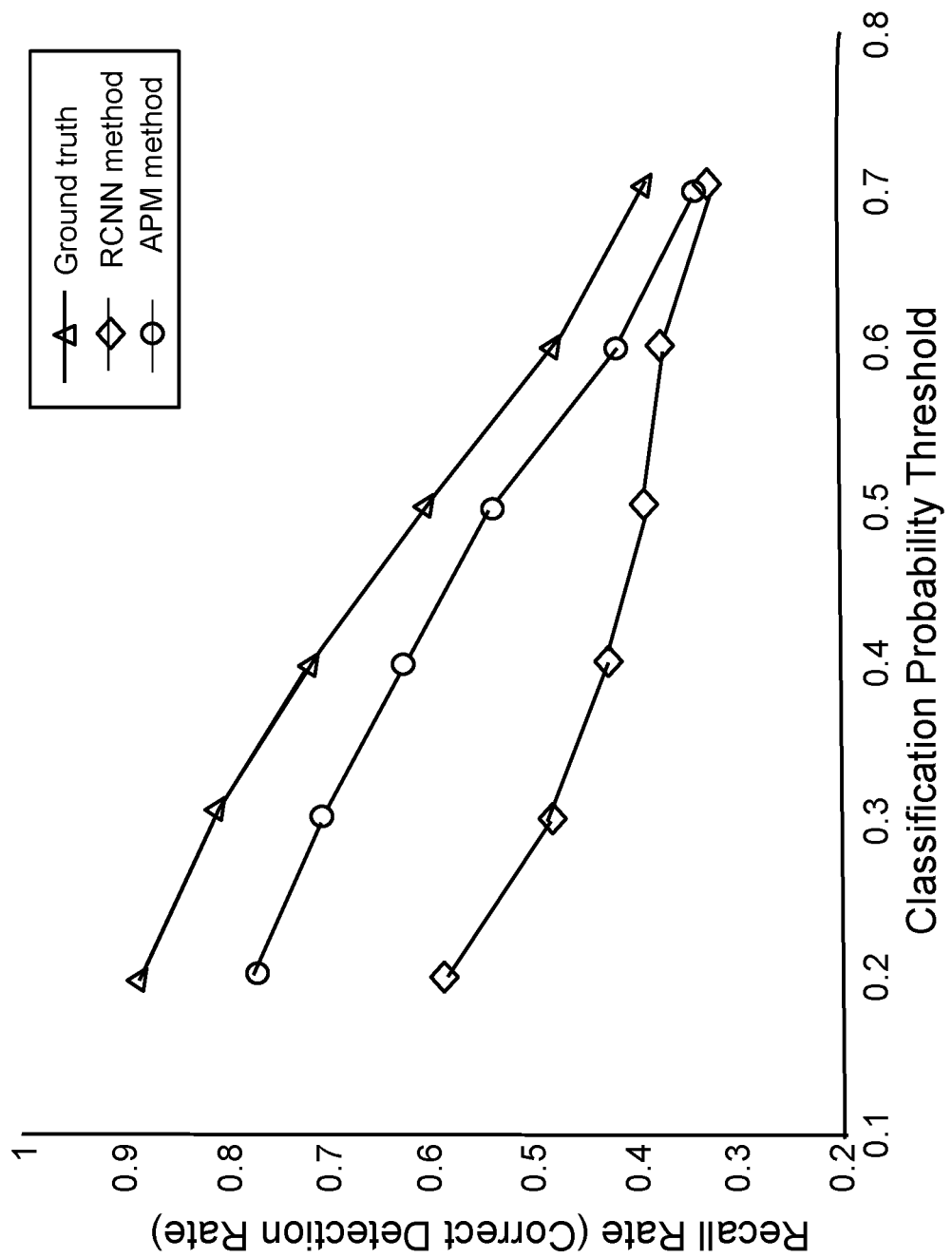
FIG. 6 is a chart comparing recognition recall rates across different classification thresholds.

To verify the efficiency and technological improvement provided by the present disclosure, the system was tested on the KITTI dataset (see Literature Reference No. 1) for car detection. This dataset was chosen since it includes ego-motion data. The present method was compared against R-CNN (Regions with Convolutional Neural Network features), which uses a different search method, but the same deep learning method for recognition (see Literature Reference No. 9). As shown in FIG. 6, on the same input and using the same classifier, the method of the present disclosure achieved higher correct recognition rates (77.3% vs 58.4%) compared to R-CNN at the same false-alarm rates. Across different classification thresholds, the present method (APM) outperformed R-CNN. The KITTI dataset that was used for car recognition has challenging cases where the occlusion rates are over 50% and the pixel size of car is less than 20×20. This challenge makes even the recognition on the ground-truth bounding boxes imperfect (only 88.53%). Nevertheless, as shown, the detection capabilities of the system described herein dramatically outperform state of the art system and, as such, provide a marked technological improvement that can be implemented in a variety of applications.

Figure 7:
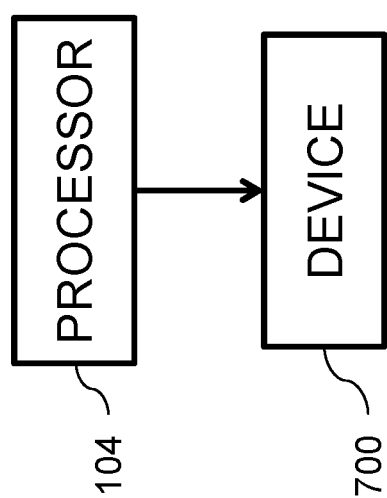
FIG. 7 is a block diagram depicting control of a device according to various embodiments.

As shown in FIG. 7, a processor 104 may be used to control a device 700 (e.g., a mobile device display, a virtual reality display, an augmented reality display, a computer monitor, a motor, a machine, a drone, a camera, an autonomous vehicle, etc.) based on detecting the object. In various aspects, the device 500 be a display, such that the control of the device 500 may be used to transform the detection of an object into a still image or video representing the object. In other embodiments, the device 500 may be controlled by the processor 104 to cause the device 500 to move or otherwise initiate a physical action (maneuver) based on the object detection.

In some embodiments, the device 500 is a drone or other autonomous vehicle that may be controlled to move based on detection of the object. For example, the system may be implemented as a key functionality for active safety and autonomous driving functions in a car. This system could be used to expand the operating envelope of autonomous lane following in Super Cruise and be a key technology for fully-autonomous driving. The system improves sensing under adverse conditions and thus can be effectively implemented in autonomous vehicles, such as by causing the autonomous vehicle to maneuver based on the detected object. Non-limiting examples of such maneuvering operations include causing the vehicle to apply brakes to slow or stop to avoid collision, causing the vehicle to turn the wheels or other steering controls to move around or otherwise avoid collision with the object, etc.

In yet some other embodiments, a camera may be controlled to orient towards the detected object. In other words, actuators or motors are activated to cause the camera (or sensor) to move or zoom in on the location where the object is localized. Further, the invention can be used to improve sensing for ISR (intelligence, surveillance, reconnaissance) applications; for example, the location of a target object can be used to modify the flight plan of autonomous unmanned aerial vehicles (UAVs) to gain more information about the target. For example, the UAV is caused to fly toward the location of the object or maintain position above the detected object. Or as another example, the UAV can be caused to circle the detected target with cameras being continuously adjusted to maintain the detected object within the cameras field of view.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for detecting moving objects, the system comprising: one or more processors and a memory, the memory being a non-transitory computer-readable medium having executable instructions encoded thereon, such that upon execution of the instructions, the one or more processors perform operations of: obtaining ego-motion velocity data of a moving platform by using a velocity sensor; generating a predicted image of a scene proximate the moving platform by projecting three-dimensional (3D) data into an image plane based on pixel values of the scene; generating a contrast image based on a difference between the predicted image and an actual image taken at a next step in time; generating an actionable prediction map based on the contrast image; detecting one or more moving objects based on the actionable prediction map; wherein the predicted image is generated for multiple time steps, resulting in both forward and backward actionable prediction maps; and further comprising an operation of generating a minimized actionable prediction map by removing ghost pixels from both the forward and backward actionable prediction maps.

2. The system as set forth in claim 1, further comprising an operation of overlaying the minimized actionable prediction map on an actual image of the scene to generate a final overlay.

3. The system as set forth in claim 2, wherein the 3D data is obtained from a stereo camera.

4. The system as set forth in claim 2, wherein the 3D data is obtained from a LIDAR sensor mounted on the moving platform and the pixel values of the scene are obtained from an image taken from a camera mounted on the moving platform.

5. The system as set forth in claim 4, wherein the LIDAR sensor and camera are mounted on the moving platform such that they are co-boresighted to look at a common field-of-view around the moving platform.

6. The system as set forth in claim 1, further comprising an operation of controlling a device based on the detection of the one or more objects.

7. The system as set forth in claim 6, wherein controlling the device includes causing a vehicle to maneuver to avoid collision with the object.

8. The system as set forth in claim 1, wherein the 3D data is obtained from a stereo camera.

9. The system as set forth in claim 1, wherein the 3D data is obtained from a LIDAR sensor mounted on the moving platform and the pixel values of the scene are obtained from an image taken from a camera mounted on the moving platform, and wherein the LIDAR sensor and camera are mounted on the moving platform such that they are co-boresighted to look at a common field-of-view around the moving platform.

10. A computer program product for detecting moving objects, the computer program product comprising: a non-transitory computer-readable medium having executable instructions encoded thereon, such that upon execution of the instructions by one or more processors, the one or more processors perform operations of: obtaining ego-motion velocity data of a moving platform by using a velocity sensor; generating a predicted image of a scene proximate the moving platform by projecting three-dimensional (3D) data into an image plane based on pixel values of the scene; generating a contrast image based on a difference between the predicted image and an actual image taken at a next step in time; generating an actionable prediction map based on the contrast image; detecting one or more moving objects based on the actionable prediction map; wherein the predicted image is generated for multiple time steps, resulting in both forward and backward actionable prediction maps; and further comprising an operation of generating a minimized actionable prediction map by removing ghost pixels from both the forward and backward actionable prediction maps.

11. The computer program product as set forth in claim 10, further comprising an operation of overlaying the minimized actionable prediction map on an actual image of the scene to generate a final overlay.

12. The computer program product as set forth in claim 11, wherein the 3D data is obtained from a stereo camera.

13. The computer program product as set forth in claim 11, wherein the 3D data is obtained from a LIDAR sensor mounted on the moving platform and the pixel values of the scene are obtained from an image taken from a camera mounted on the moving platform.

14. The computer program product as set forth in claim 13, wherein the LIDAR sensor and camera are mounted on the moving platform such that they are co-boresighted to look at a common field-of-view around the moving platform.

15. The computer program product as set forth in claim 10, further comprising an operation of controlling a device based on the detection of the one or more objects.

16. The computer program product as set forth in claim 15, wherein controlling the device includes causing a vehicle to maneuver to avoid collision with the object.

17. The computer program product as set forth in claim 10, wherein the 3D data is obtained from a stereo camera.

18. The computer program product as set forth in claim 10, wherein the 3D data is obtained from a LIDAR sensor mounted on the moving platform and the pixel values of the scene are obtained from an image taken from a camera mounted on the moving platform, and wherein the LIDAR sensor and camera are mounted on the moving platform such that they are co-boresighted to look at a common field-of-view around the moving platform.

19. A method for detecting moving objects, the method comprising an act of: causing one or more processors to execute instructions encoded on a non-transitory computer-readable medium, such that upon execution, the one or more processors perform operations of: obtaining ego-motion velocity data of a moving platform by using a velocity sensor; generating a predicted image of a scene proximate the moving platform by projecting three-dimensional (3D) data into an image plane based on pixel values of the scene; generating a contrast image based on a difference between the predicted image and an actual image taken at a next step in time; generating an actionable prediction map based on the contrast image; detecting one or more moving objects based on the actionable prediction map; wherein the predicted image is generated for multiple time steps, resulting in both forward and backward actionable prediction maps; and further comprising an operation of generating a minimized actionable prediction map by removing ghost pixels from both the forward and backward actionable prediction maps.

* * * * *